United States Patent [19]
Montalbano

[11] Patent Number: 5,180,075
[45] Date of Patent: Jan. 19, 1993

[54] PIZZA PACKAGING SYSTEM

[76] Inventor: Henry Montalbano, 4206 Hartfield Grove, Mississauga, Canada, L4W 2Y8

[21] Appl. No.: 783,548

[22] Filed: Oct. 28, 1991

[51] Int. Cl.$^5$ .......................... B65D 5/48; B65D 5/60
[52] U.S. Cl. .................................... 220/403; 220/410; 229/122; 229/120.32; 229/906; 426/128; 426/115
[58] Field of Search ................... 229/120, 122, 120.32, 229/902, 906, DIG. 14; 220/403, 408, 410; 206/561; 426/115, 119, 128, 129, 130

[56] References Cited

U.S. PATENT DOCUMENTS

| | | | |
|---|---|---|---|
| 2,162,089 | 6/1939 | Kagen | 229/906 |
| 2,711,819 | 6/1955 | Vanderlugt, Jr. | 206/561 |
| 3,083,107 | 3/1963 | Tindall | 426/115 |
| 3,275,220 | 9/1966 | Hubbard | 229/122 |
| 3,324,999 | 6/1967 | Farquhar | 426/115 |
| 3,398,000 | 8/1968 | Peters | 229/122 |
| 3,441,418 | 4/1969 | Nishikiori | 426/128 |
| 3,650,383 | 3/1972 | Nigro | 426/128 |
| 3,759,720 | 9/1973 | Young | 206/45.19 |
| 4,305,545 | 12/1981 | Hart et al. | 229/906 |
| 4,361,227 | 11/1982 | Paulucci | 426/128 |
| 4,376,558 | 3/1983 | Bandar | 229/122 |
| 4,592,914 | 6/1986 | Kuchenbecker | 229/DIG. 14 |
| 5,061,501 | 10/1991 | Lowe | 426/129 |

Primary Examiner—Gary E. Elkins
Attorney, Agent, or Firm—David J. French

[57] ABSTRACT

A pizza delivery system is provided which combines the use of inexpensive paper bags and flat paperboard trays, with an insulating reusable container that permits pizza to be delivered in a warm, unsoggy condition.

8 Claims, 4 Drawing Sheets

PIZZA PACKAGING SYSTEM

FIELD OF THE INVENTION

This invention relates to a system for packaging pizza food products and the like. More particularly, it relates to a series of packaging components, constituting a pizza delivery system, suited to the delivery of pizza in a state whereby the pizza is kept warm longer, with a reduced tendency to become soggy.

BACKGROUND TO THE INVENTION

It is customary for pizzas to be prepared for take-out by customers, or for delivery to the houses of persons who place orders for pizzas by telephone. One format for packaging pizzas in such circumstances is to place the pizza in a single-walled, paper-board box that folds up from a flat paper-board blank. Such boxes customarily enclose the pizza with a lid.

Boxes of this type provide only a moderate degree of heat retention for the pizza during delivery. If the boxes are unvented, an extended delivery period can result in a pizza which is both cool and soggy.

To maintain the warmth of freshly prepared pizzas, delivery is sometimes effected by placing the boxed pizza within an insulated vinyl outer bag. While this delivery system maintains pizza warmth for a longer period of time, the vapour-proof character of the combined containers increases the likelihood that the pizza will arrive at its destination in a soggy condition.

The use of paper-board boxes of adequate strength to contain pizzas is relatively expensive. Efforts have been made to develop less expensive means for packaging pizzas for delivery to customers.

A cheaper container which allows moisture to evaporate has been proposed in the form of a paperboard tray with at least a partially open top. To retain heat and protect the pizza from being soiled, such a tray may be placed within a paper bag. Patents proposing such a system include U.S. Pat. No. 4,301,960 to Alexander et al and U.S. Pat. No. 4,913,340 to Hitch. In this second reference, the tray is described as having an open central portion on the top and upright interlocking sides that are held in place by interlocking tabs. The erect side walls protect the pizza from contact with the enveloping bag.

A further reference which provides, as a container for pizzas, a paperboard tray with side walls and no lid that is intended to slide within a paper bag is U.S. Pat. No. 4,494,689 to Ilitch. Again in this reference the side walls of the container are inter-engaged at their corners to hold the walls in an upright position and protect the upper surface of the pizza from contact with the bag.

In practice, it is also known to provide a lower cost tray wherein only two opposing side walls are provided. In this case, the enveloping bag is sized to hold the unsupported walls in a partially elevated position. The side walls, which are bent-up from the bottom panel of the tray along score lines, possess a natural resilience that causes them to spring outwardly. With a properly sized bag, this springing action tightens the bag and reduces any tendency for the bag overlying the pizza to be slack and contact the pizza's upper surface.

The foregoing references reflect minimal cost formats for the packaging of pizza. While the use of the paper bag for enclosure of the pizza allows for moisture to escape (through permeation of the paper), the thermal insulating qualities of this packaging format are low.

A more expensive packaging format that aspires to provide increased thermal insulation for pizza is shown in U.S. Pat. No. 4,919,326 to Deiger. This reference describes the use of double-walled corrugated paperboard to provide a container. To prevent moisture from accumulating within the closed box of this invention ventilation openings are provided.

Dieger recognizes that pizzas are capable of releasing oil or grease from their hot, lower crust. "Chipboard" containers are specifically identified as suffering under such circumstances. To protect the corrugated bottom of his container Deiger proposes lining at least the bottom of the box with a layer of impermeable insulative sheeting, such as polystyrene.

While the use of a polystyrene lining protects the cardboard of the box from oil and moisture, Deiger recognizes that its non-permeable character will tend to make the underside of the pizza crust soggy. To meet this problem, he proposes that a lattice of air channels be pressed into the polystyrene covering.

While the Deiger box may perform in a superior manner, it will only do so at a considerable cost. Corrugated doublesided paperboard is substantially more expensive than single sheets of paperboard. It is accordingly highly undesirable to use such a format box for the one-use function of a single pizza delivery.

A hybrid packaging format is proposed in U.S. Pat. No. 4,922,626 to Fiddler. In this reference, a standard pizza box with vent openings to permit moisture to escape is carried within a larger, insulative container which also contains a motorized fan, heater and desiccant material. Demoisturizing air is then circulated over the pizza in cyclic manner, within the outer container. Power for the motor and heater is provided through the cigarette lighter of an automobile.

Such an arrangement is intended to replace the more common insulated vinyl bag within which simply boxed pizzas are now delivered. It is, however, a very expensive means of packaging pizza for delivery. This will be particularly appreciated where a delivery vehicle is required on occasion to carry two or four pizzas to different locations. Fiddler would then require a capital investment in a corresponding number of high cost outer containers.

From the foregoing it is apparent that a pizza packaging system is required that is low in cost yet ensures that pizzas, after the time delay required for delivery, are still warm, without having become substantially soggy. The present invention addresses this problem. Through its combination of components, this invention will meet both the customer's desire to receive delivered pizzas which are still highly palatable, in terms of warmth and crispness, and the pizza supplier's desire to minimize packaging costs.

The invention will first be summarized. Then a preferred embodiment will be described in detail, with reference to the drawings. The disclosure will then end with claims that further describe and define the invention in its most general and more specific aspects.

SUMMARY OF THE INVENTION

In its broadest aspect the invention comprises the following components to constitute a pizza packaging system for delivered pizza:

(1) a paperboard tray for carrying pizza;

(2) an enveloping, moisture-permeable bag for covering and containing pizza placed on the aforesaid tray; and (3) a reusable, insulating outer box, having a compartment formed therein, such compartment being dimensioned to receive a pizza carried by the said tray and contained within the aforesaid bag.

In use, a bagged pizza, with its individual tray is placed, hot and fresh, in the outer box at the pizza bakery. The delivery agent then transports the pizza, so boxed, to the customer. Upon arrival, the delivery agent removes the pizza from the outer box and presents the bagged pizza, on its individual tray, to the customer. The outer box is then retained by the delivery agent for re-use.

By this procedure, the pizza is maintained in a quality condition during delivery. At the same time, only the low-cost paperboard tray and bag are left with the customer. The higher cost, outer box container is retained for re-use. While such a container may have sufficient durability for only a limited number of re-uses, it will be considerably cheaper than the prior art proposals for permanent outer containers.

In a preferred configuration the outer box is provided with two or more compartments, positioned one above or below each other.

By a further feature of the invention the compartment or compartments within the outer box may be provided with an air-permeable, elevating grid that will support the bagged pizzas and allow air to circulate beneath the lower surface of each bagged pizza so as to diminish the tendency of such pizzas to become soggy.

By a further feature of the invention, the outer box may be provided with ventilation outlets to permit further escape of moisture from the pizza.

By a further feature of the invention, the tray for each pizza may be provided with at least two, opposed fold-edup sides, held at an inclined angle by the enveloping bag, and the compartment within the outer box may be dimensioned to receive the bagged pizza with a close fit, across the aforesaid folded-up sides. By this arrangement the pizza will resist sliding within the outer box, while access to remove the bagged pizza on its tray may be easily effected by lifting an inclined, folded-up side more vertically, and then sliding the pizza out of the compartment.

A valuable feature of the invention is the formation of two or more compartments within the outer box, each being located above another. This feature considerably reduces the rate of heat loss from each of the packaged pizzas stored therein by reducing the amount of surface area exposed to the lower-temperature outside environment.

In such a stacked format, while the heat retention by each of the pizzas will be enhanced, the escape of moisture from at least one major side of each pizza will be reduced. Accordingly, the provision of ventilation outlets along the sides of the outer box and the inclusion air-permeable, elevating grids beneath each of the bagged pizzas is especially preferable to accommodate this arrangement.

These and further features of the invention will be more readily understood from the description of the preferred embodiments of the invention which now follow. These embodiments are to be considered as examples of applications of the invention, in the best modes as presently understood by the inventor. The invention in its broadest and more particular aspects is further described and defined by the claims which follow the description of the preferred embodiments.

DESCRIPTION OF THE PREFERRED EMBODIMENTS

Figure 1:
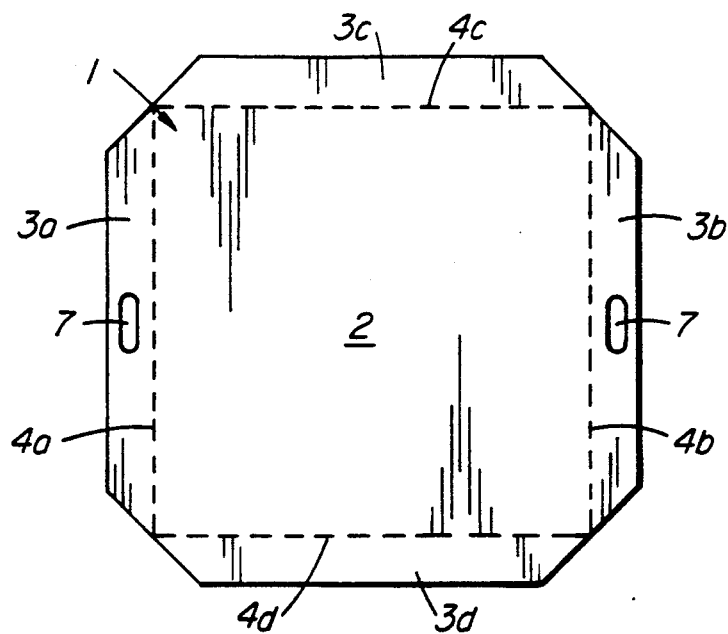
FIG. 1 is a drawing of a blank pattern for the paperboard tray.

In FIG. 1 a cut and scored blank 1 of 30-point box board, or 125 overtest, B-flute corrugated, paperboard is shown, which is suitable to serve as a tray. The paperboard blank 1 has a rectangular centre portion 2 and two sets of outer transversely opposed wall panels 3a, 3b, 3c, 3d. The front and rear panels 3c, 3d, though preferred, are optional).

Figure 2:
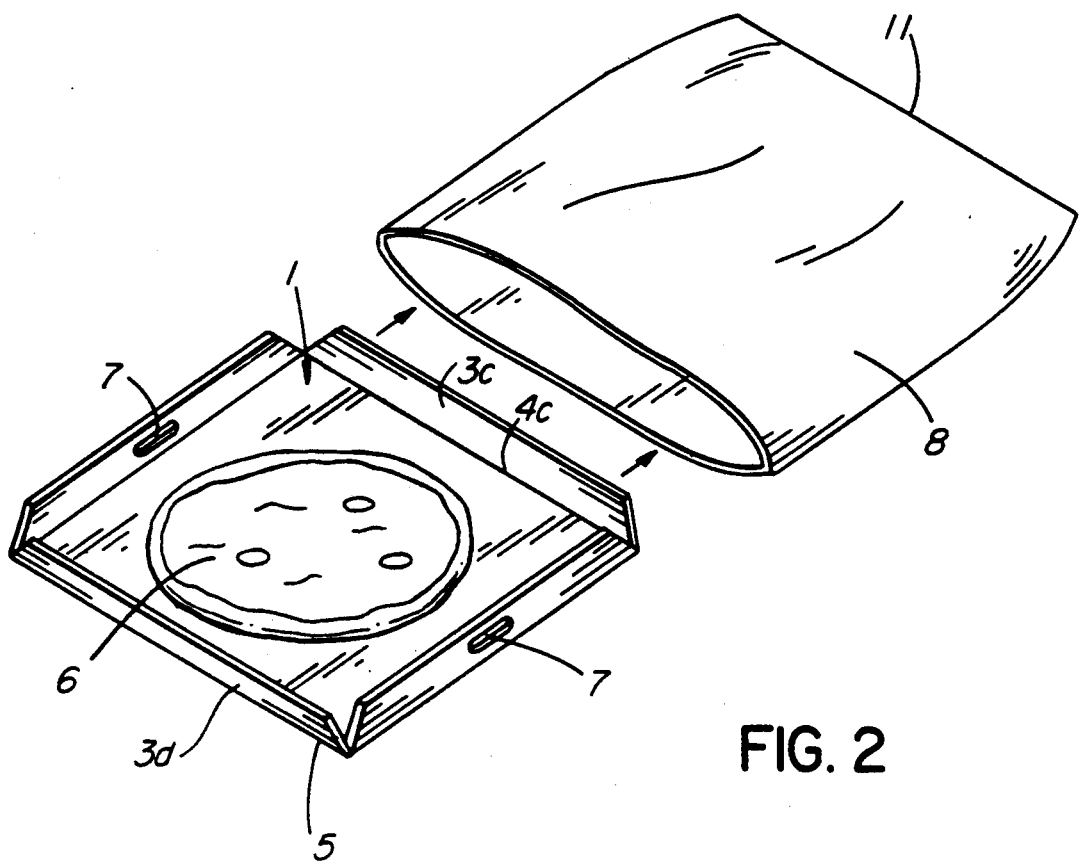
FIG. 2 shows the paperboard tray, with a pizza thereon, aligned for sliding into a paper bag.

When the sidewall panels 3a, b, c, d are bent upwardly along score lines 4a, b, c, d, a tray 5 as shown in FIG. 2 is formed which is suitable for receiving a pizza 6. Handle openings 7 in the sidewall panels 3a, 3b provide handle access for lifting the tray 5.

The score lines 4a, b, c, d, are not so deep as to remove the resilient tendency of the side panels 3a, b, c, d to lie flat. The tray 5, with the pizza 6 in place, is inserted into a bag 8 with the transverse side wall panels 3a, 3b in a nearly fully erect position.

Figure 3:
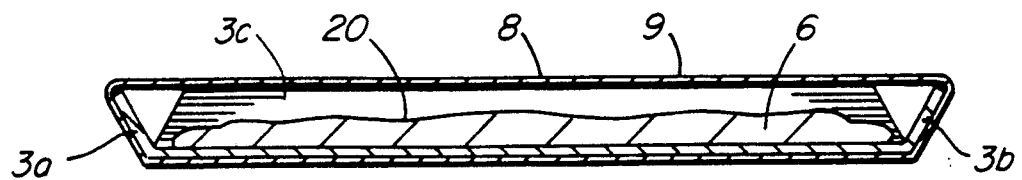
FIG. 3 is a cross-section of a bagged pizza on its tray.

The bag 8 is dimensioned so as to maintain the side wall panels 3a, 3b in an angled position once they are released after insertion in the pizza. This is shown in FIG. 3 where it is apparent that the resilient tendency of the side wall panels 3a, 3b to deflect outwardly has tightened the upper surface 9 of the bag 8 so as to hold it out of contact from the upper surface 20 of the pizza 6.

Front and rearward side wall panels are not necessary to achieve this effect. The transversely located side wall panels 3a, b are sufficient to achieve this effect. However, the presence of at least an inward rear side wall panel 3c on the border nearest the sealed end 11 of the bag 8 is preferred as it presents a supplementary support to ensure that the bag is held off the upper surface 20 of the pizza 6, during the process of inserting the pizza 6 into the bag 8.

A further advantage of front and rear wall panels, if they are incorporated into the tray 5, is that they tend to reinforce the planar rigidity of the tray 5, once the pizza 6 and tray 5 are removed from the bag 8, to be carried on its tray 5 by the handle openings 7 for presentation at a table.

Figure 4:
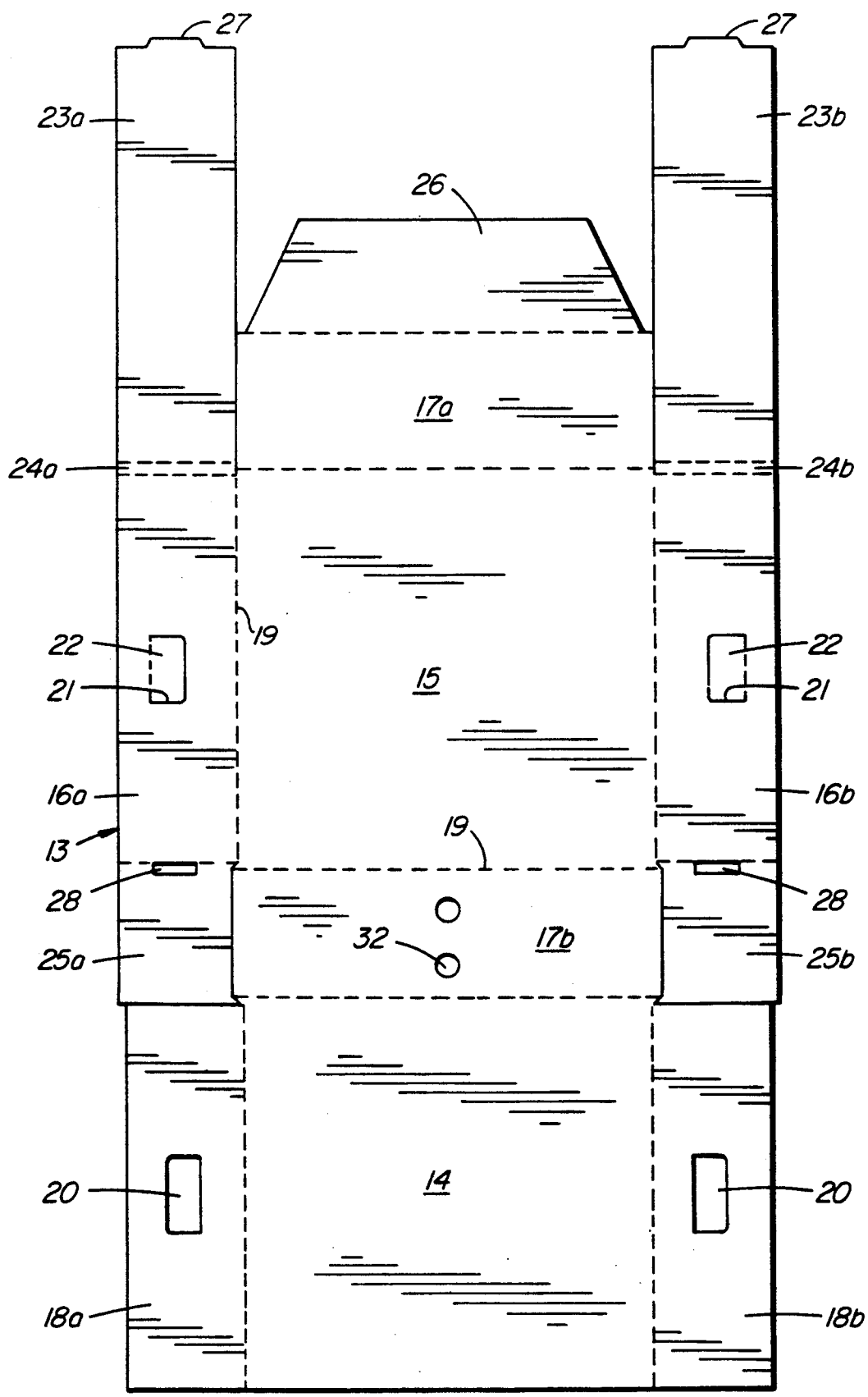
FIG. 4 is a blank pattern for forming the outer box.
Figure 6:
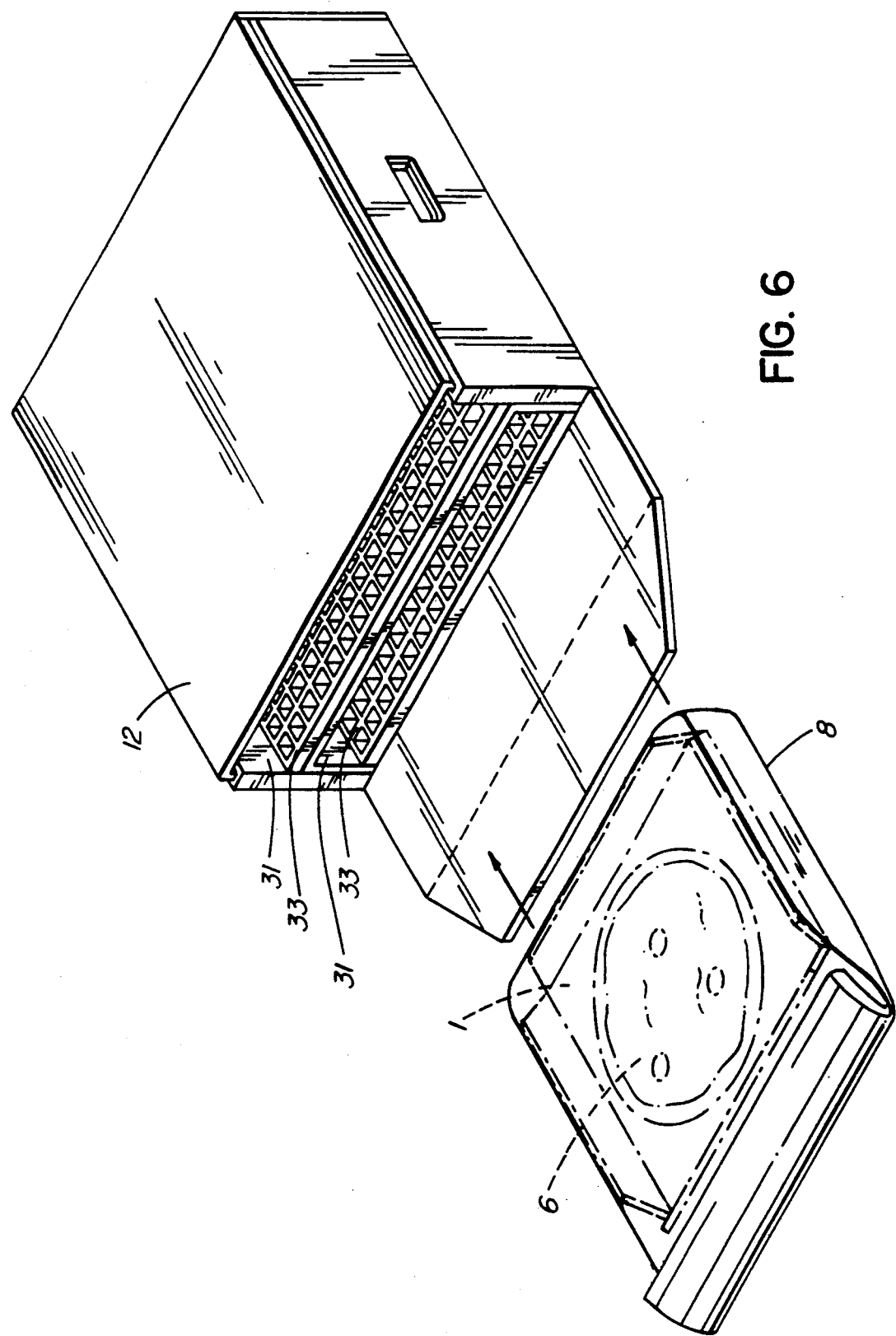
FIG. 6 is a perspective view of the outer box when assembled.

To contain the bagged pizza for delivery, an outer box 12, preferably made of double-wall, corrugated paperboard, or synthetic equivalent, is provided. A blank 13 for such a box 12 is depicted in FIG. 4.

This outer box blank 13 has rectangular, or square upper and lower main panel portions 14, 15. Opposed outer box side wall panels 16a, 16b, 17a, 17b are provided around the four sides of each of the lower main panel portion 15 respectively. Score lines 19 provide for easy bending of these panels in order to erect the outer box 12 into its completed form.

The upper main panel portion 14 is provided with two opposed supplementary side wall panels 18a, 18b, each provided with openings 20 to serve as handles. Similar openings 21, each with a flap 22, are provided in the lower panel side walls 16a, 16b. The flaps 22, when folded inwardly, serve to hold the side walls 16a, 18a; 16b, 18b together once the outer box 12 is erected. They also present a smooth surface for grasping the outer box 12 by the handle openings 21.

Two further supplementary side walls 23a, 23b are provided, attached to the lower side wall panels 16a, 16b and joined thereto by narrow intermediate panels 24a, 24b. These side walls are not perforated with handle openings but serve to seal the inner compartments 31 of the outer box 12, once erected. The intermediate panels 24a, 24b are of a width to allow the supplementary side wall panels 18a, 18b to fold around the other side wall panels 16a, 16b and 17a, 17b on assembly.

Side flaps 25a, 25b extending from the side walls 16a, 16b form corners to anchor the side walls in place. The sidewall 17a opposite the main upper panel 14 serves as an access panel or door on assembly. It also carries a flap 26 for retaining this side wall 17a closed during delivery.

Assembly tabs 27 are provided on the supplementary side walls 23a, 23b to engage with complementary assembly slots 28 in the principal side walls 16a, 16b to maintain the shape of the outer box 12, once erected.

Figure 5:
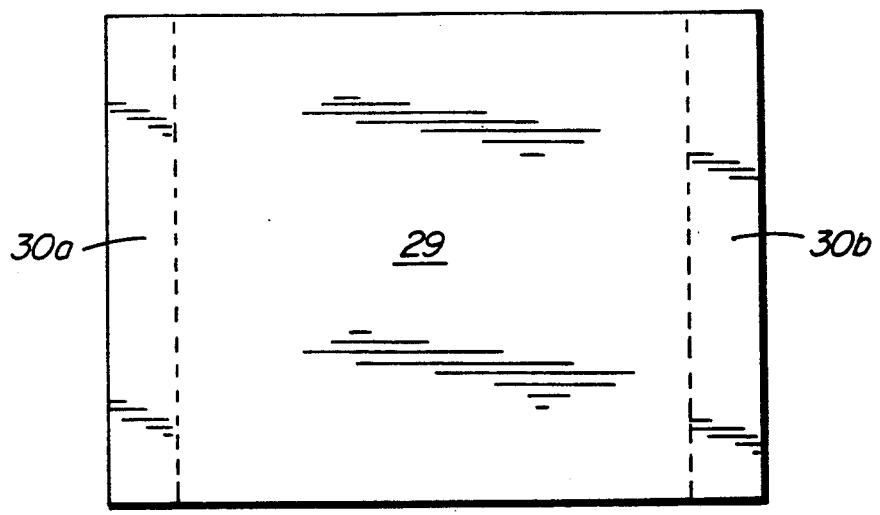
FIG. 5 is the blank pattern for forming a shelf to be inserted within the outer box.
Figure 7:
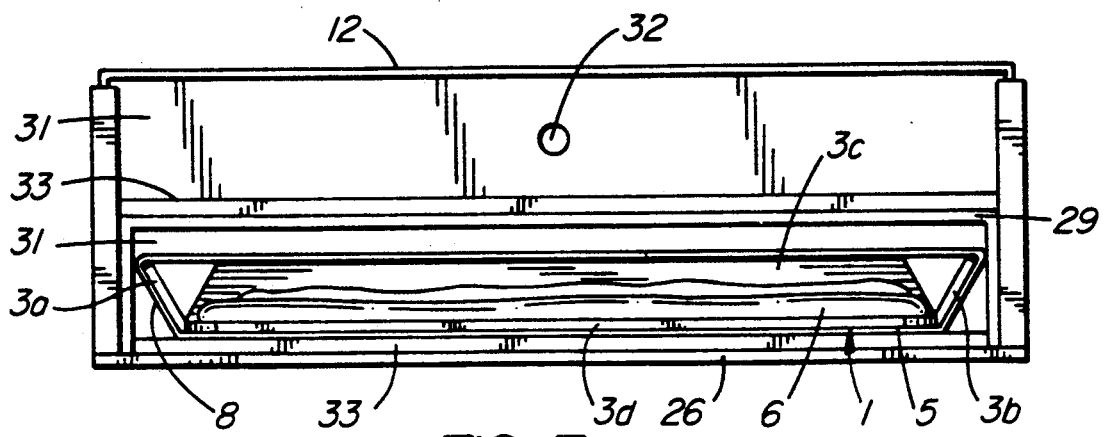
FIG. 7 is a front elevational view with the access panel opened.

Upon erection, the upper main panel 14 will overlie the lower main panel 15, and side walls of triple thickness will be formed. A shelf 29, shown in FIG. 5, provided with additional half-height side wall portions 30a, 30b may then be slid into the box 12 to create two compartments 31. Multiple shelves, where more than two compartments are required, may be inserted, each resting on the shelf or surface below.

Because of the extra width of the composite side walls so formed (vis: 16a, 18a, 23a, 30a), outer box 12 will be greatly stiffened and will accept stacking of multiple boxes without being crushed.

Vent holes 32 may be provided in the perimeter of the box to provide a means for moisture to escape. This is particularly suitable if several boxes are to be stacked.

If corrugated paperboard is utilized for the outer box 12 or shelf 29, this should preferably be rendered moisture resistant over at least the portion of their surfaces that are proximate to the pizzas. This may be achieved by waxing, or by equivalent known procedures. The lower main panel portion 14 in particular of the blank 13, and shelf 29, and the tray 5 as well, may optionally be moisture-proofed with an aluminum foil or plastic resin coating in order to protect the outer box during multiple uses. In the case of the tray, use of an aluminum foil will facilitate reheating at the customer's home.

Since the pizza to be placed within each compartment 31 can be packaged on the paperboard surface of the tray 5 within the bag 8, use of such intervening media will permit the passage of moisture and reduce the tendency of the pizza crust overlying a moisture-proofed surface to become soggy. To ensure that this condition does not readily develop, an air-permeable, elevating grid 33 is preferably placed on the bottom surface of each compartment 31. A convenient source for a suitable grid 33 is the plastic matrix produced for use as a light diffuser for ceiling lighting.

On the basis of the foregoing it will be seen that an invention has been described which will allow pizza to be delivered to consumers in a low cost format, while providing for the preservation of the quality of the product up to the time of delivery.

It has been found that in the format of the preferred embodiment, a set of two pizzas removed hot from the oven at 150 degrees Fahrenheit and inserted directly into the box will drop to a temperature of 138 degrees F in 40 minutes without becoming soggy. The same pizzas, when boxed in paperboard and placed within a vinyl bag become soggy after this period of time.

The preceding description has been intended to demonstrate the construction and implementation of a preferred embodiment of the invention. The invention, and its variants, is implicit in and demonstrated by that embodiment. The invention, is in its most general and more particular forms, is further described and defined in the claims which now follow.

I claim:

1. A pizza packaging system for delivered pizza comprising:
   (1) a paperboard tray for carrying pizza;
   (2) an enveloping, moisture-permeable bag for covering and containing pizza placed on the aforesaid tray; and
   (3) a reusable, insulating outer box, having a compartment formed therein, such compartment being dimensioned to receive a pizza carried by the said tray and contained within the aforesaid bag.

2. A pizza packaging system as in claim 1 wherein the outer box is provided with two or more compartments, each of such compartments being positioned one above or below the other.

3. A pizza packaging system as in claim 1 or 2 further comprising within each of the compartments in the outer box, an air-permeable, elevating grid that will support the bagged pizza within such compartment and allow air to circulate beneath the lower surface of the bagged pizza so as to diminish the tendency of such pizza to become soggy.

4. A pizza packaging system as in claim 1 or 2 wherein the outer box is provided with ventilation outlets to permit further escape of moisture from the pizza.

5. A pizza packaging system as in claim 3 wherein the outer box is provided with ventilation outlets to permit further escape of moisture from the pizza.

6. A pizza packaging system as in claim 1 or 2 wherein the tray for said pizza is provided with at least two, opposed folded-up sides, held at an inclined angle by the enveloping bag, and the compartments within the outer box are dimensioned to receive the bagged pizza with a close fit, across the aforesaid folded-up sides, that limits sliding of the bagged pizza within the outer box.

7. A pizza packaging system as in claim 1 or 2 wherein the tray for said pizza is provided with four, outer opposed fold-up sides, at least 2 sides of which are held at an inclined angle by the enveloping bag.

8. A pizza packaging system as in claim 7 wherein the compartments within the outer box are dimensioned to receive the bagged pizza with a close fit, across the aforesaid folded-up sides, that limits sliding of the bagged pizza within the outer box.

* * * * *